(12) United States Patent
Wu et al.

(10) Patent No.: US 11,489,452 B2
(45) Date of Patent: Nov. 1, 2022

(54) BRIDGELESS SINGLE-STAGE SINGLE-INDUCTOR MULTIPLE-OUTPUT (SIMO) AC-AC CONVERTER TOPOLOGY

(71) Applicant: THE UNIVERSITY OF HONG KONG, Hong Kong (HK)

(72) Inventors: Jiayang Wu, Hong Kong (HK); Ting Leung Albert Lee, Hong Kong (HK); Siew Chong Tan, Hong Kong (HK); Shu Yuen Hui, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 0 days.

(21) Appl. No.: 17/221,950

(22) Filed: Apr. 5, 2021

(65) Prior Publication Data
US 2022/0294359 A1     Sep. 15, 2022

Related U.S. Application Data

(60) Provisional application No. 63/158,975, filed on Mar. 10, 2021.

(51) Int. Cl.
*H02M 5/293* (2006.01)
*H02M 1/00* (2006.01)
*H02J 50/12* (2016.01)
*H02M 7/48* (2007.01)

(52) U.S. Cl.
CPC .......... *H02M 5/2932* (2021.05); *H02J 50/12* (2016.02); *H02M 1/009* (2021.05); *H02M 7/4818* (2021.05)

(58) Field of Classification Search
CPC ............ H02J 50/00; H02J 50/12; H02M 5/02; H02M 5/06; H02M 5/22; H02M 5/225; H02M 5/275; H02M 1/009
See application file for complete search history.

(56) References Cited

U.S. PATENT DOCUMENTS

2018/0092179 A1* 3/2018 Guo .................. H02M 1/14
2019/0103766 A1* 4/2019 Von Novak, III .... H02M 3/137
2020/0091836 A1  3/2020 Lee et al.

FOREIGN PATENT DOCUMENTS

WO    WO-2018107392 A1 *  6/2018  .............. H02J 7/025

OTHER PUBLICATIONS

Albert Ting Leung Lee et. al., Buck-Boost Single-Inductor Multiple-Output High-Frequency Inverters for Medium-Power Wireless Power Transfer, Apr. 2019, IEEE Transactions On Power Electronics, vol. 34, No. 4, pp. 3457-3473 (Year: 2019).*
NXP, "Integrated low cost Qi wireless charging transmitters NXQ1TXH5, NXQ1TXL5".
Texas Instruments, "Qi Compliant Wireless Power Transmitter Manager".
NXP, "Freescale Semiconductor".

* cited by examiner

*Primary Examiner* — Alex Torres-Rivera
(74) *Attorney, Agent, or Firm* — Amin, Turocy & Watson, LLP

(57) ABSTRACT

Disclosed is an AC-AC power converter with multiple AC voltage output branches. The AC-AC power converter is bridgeless and contains only one power stage. The AC-AC power converter consists of only one inductor for power conversion and provides a current source for successively feeding multiple output branches one at a time. Each output branch can be selected by the corresponding switch and its resonant circuit turns the input current source into an AC power source.

20 Claims, 13 Drawing Sheets

Table I

| Power Stage of the proposed SIMO converter | Total number of power MOSFETs |
|---|---|
| Buck | $2(N+2)$ |
| Boost | $2(N+1)$ |
| Buck-boost | $2(N+1)$ |

Switching sequence when $V_{in} > 0$

Switching sequence when $V_{in} < 0$

Table II

| Design Parameter | Value |
|---|---|
| Input voltage ($V_{in}$) | 110 V (60 Hz) |
| Switching Frequency | 333 kHz |
| Main Inductor | 10 µH |
| Capacitor in the resonant tank | 0.5 µF |
| Inductor in the resonant tank | 4 µH |
| Resistor in the resonant tank | 100 Ω |

BRIDGELESS SINGLE-STAGE SINGLE-INDUCTOR MULTIPLE-OUTPUT (SIMO) AC-AC CONVERTER TOPOLOGY

CROSS REFERENCE TO RELATED APPLICATIONS

This application claims priority to U.S. Provisional application Ser. No. 63/158,975, filed on Mar. 10, 2021, which is incorporated herein by reference.

TECHNICAL FIELD

Disclosed are AC-AC SIMO converters that offer a simple, compact, scalable and low-cost solution only a single inductor is employed to drive multiple independent AC loads. The loads can be portable electronics products with compatible receiver coils, heating utensils such as those suitable for inductive cooking or home appliances using electric motors such as fans, vacuum cleaners, etc.

BACKGROUND

Conventional multiple-output architecture employs multiple power converters, each generates an AC output to supply an AC load, such as a transmitting coil for a wireless power transfer system. An AC/DC adapter performs AC-DC conversion from the AC mains supply to provide a DC bus. The power stage of each transmitter typically consists of a full-bridge inverter and a resonant network. A major drawback of this conventional topology is that the number of DC-AC converters (or inverters) is directly proportional to the number of AC loads. Therefore, the number of inverters increases with an increasing number of AC loads, which leads to higher costs and larger size.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention.

Rather, the sole purpose of this summary is to present some concepts of the invention in a simplified form as a prelude to the more detailed description that is presented hereinafter.

Disclosed herein are systems for generating multiple independent alternating current (AC) voltages from a AC voltage source in a single-inductor multiple-output (SIMO) switching converter (SIMO AC-AC converter), comprising: a AC voltage source for providing electrical energy; a front-stage power converter consisting of only one inductor as an energy storage element for power conversion; and a plurality of selectable output branches, each selectable output branch comprising an output selection switch, a resonant tank, and a transmitter coil, wherein the resonant tank turns input AC power into an AC power for feeding the transmitter coil.

Also disclosed are method for generating multiple independent alternating current (AC) voltages from a AC voltage source in a single-inductor multiple-output (SIMO) switching converter (SIMO AC-AC converter), involving providing electrical energy from a AC voltage source; and generating multiple AC outputs using a front-stage power converter consisting of only one inductor as an energy storage element for power conversion and a plurality of selectable output branches, each selectable output branch comprising an output selection switch, a resonant tank, and a transmitter coil, wherein the resonant tank turns input AC power into an AC power for feeding the transmitter coil.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

Table I reports the total number of switches for various types of power stage of the inverter in another embodiment.

Figure 4:
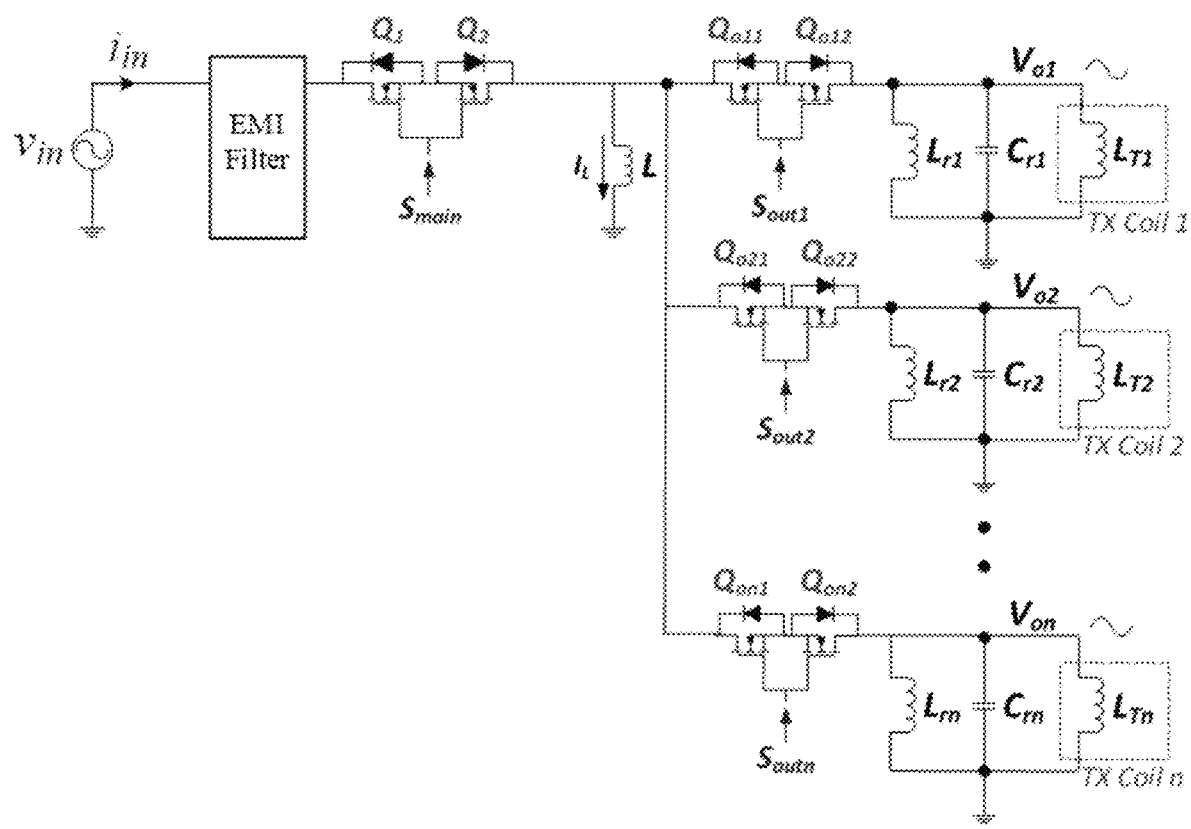

FIG. 4 depicts a bridgeless SIMO AC-AC converter with buck-boost power stage in another embodiment.

Figure 5:
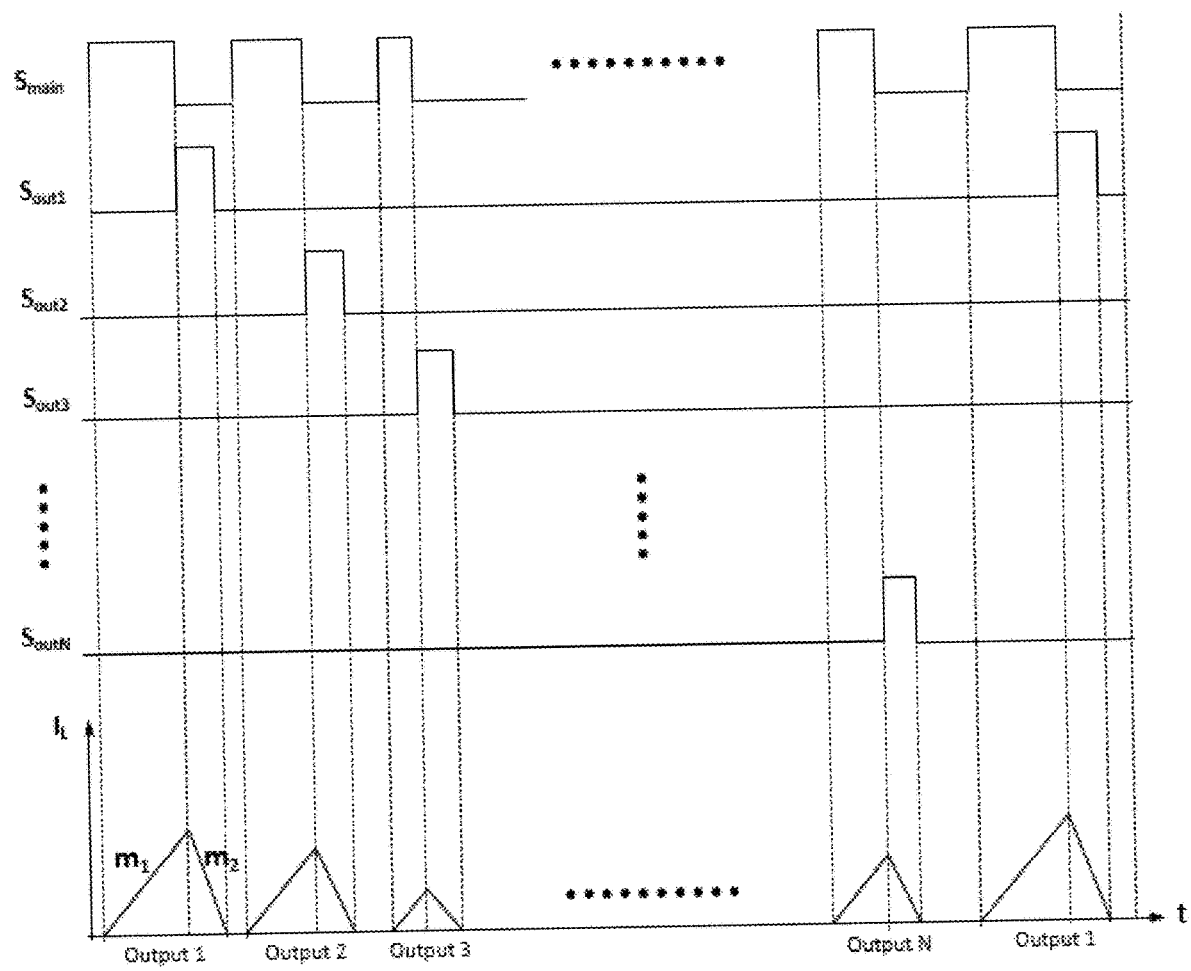

FIG. 5 depicts the timing relationship for the main switch, output switches, and the inductor current in another embodiment.

Figure 6:
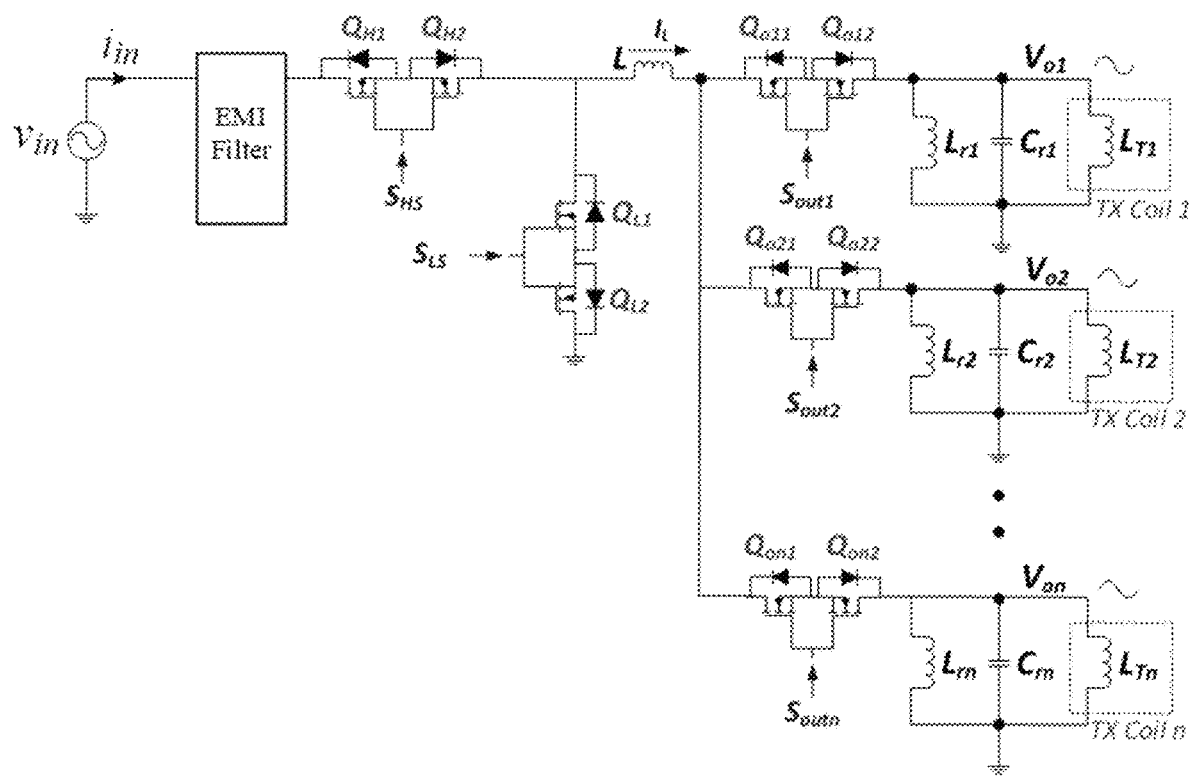

FIG. 6 depicts the circuit topology of the SIMO converter with buck power stage in another embodiment.

Figure 7:
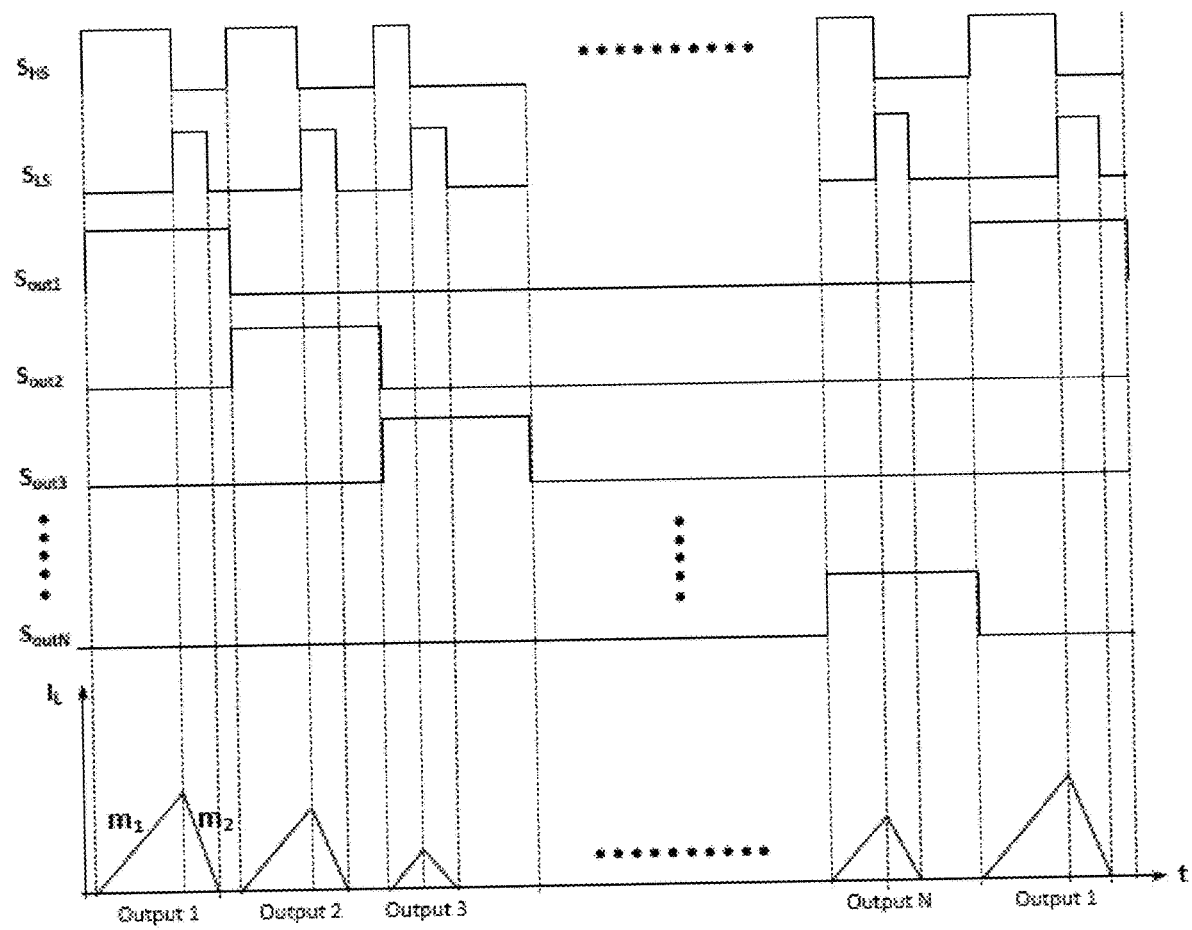

FIG. 7 depicts the timing relationship for the power switches, output switches, and the inductor current in another embodiment.

Figure 8:
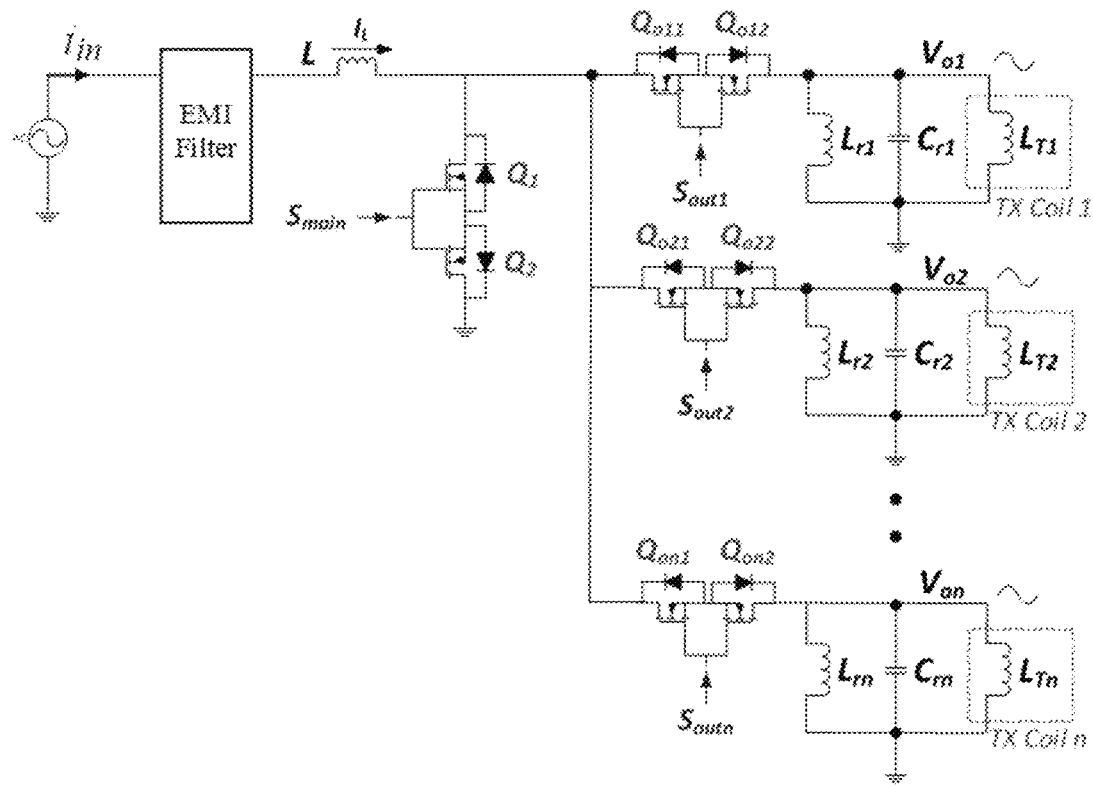

FIG. 8 depicts the circuit topology of the proposed SIMO converter with boost power stage in another embodiment.

Figure 9:
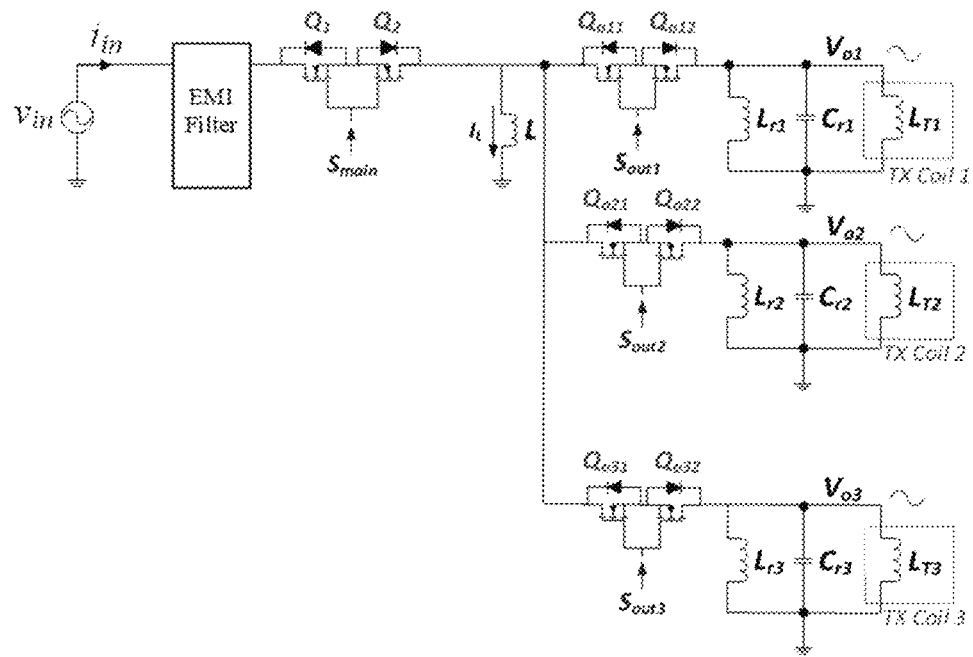

FIG. 9 depicts the circuit topology of the single-inductor three-output (SITO) converter with buck-boost power stage in another embodiment.

Figure 10A:
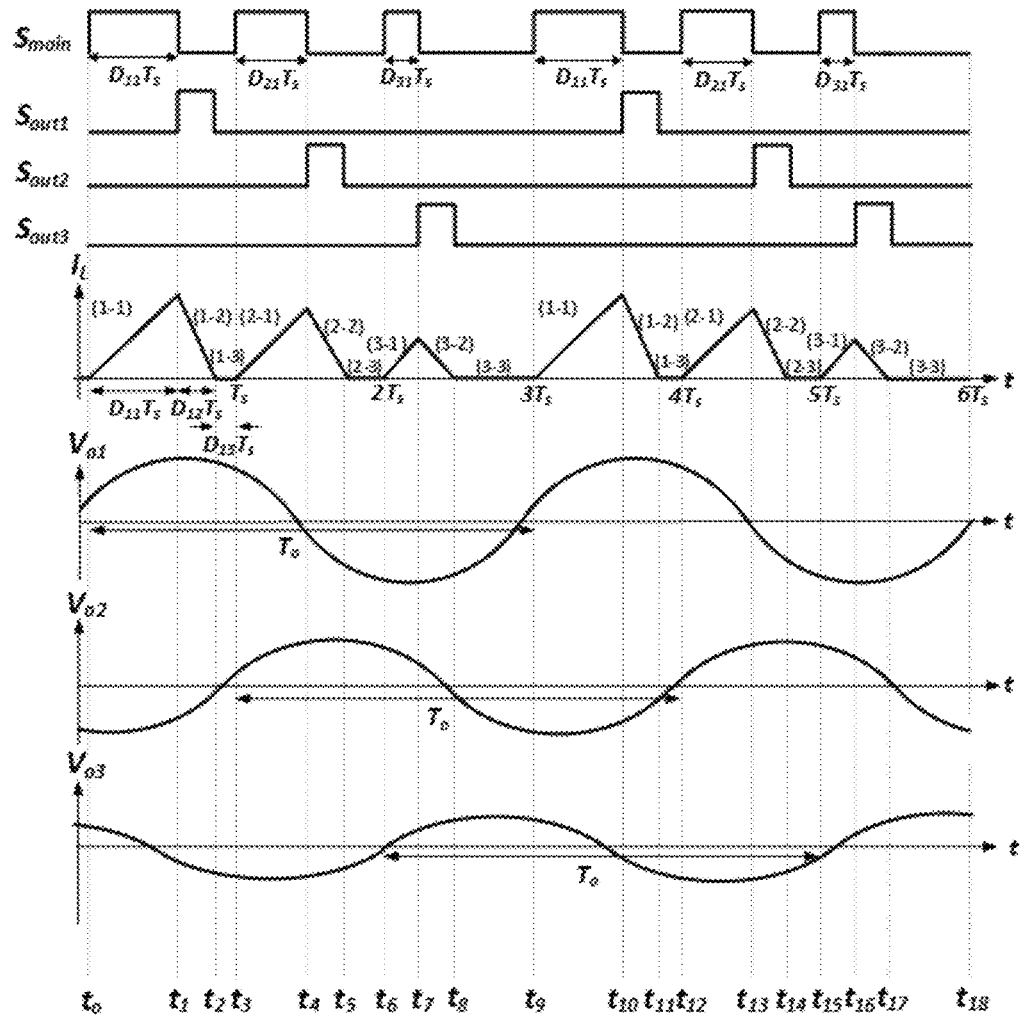
Figure 10B:
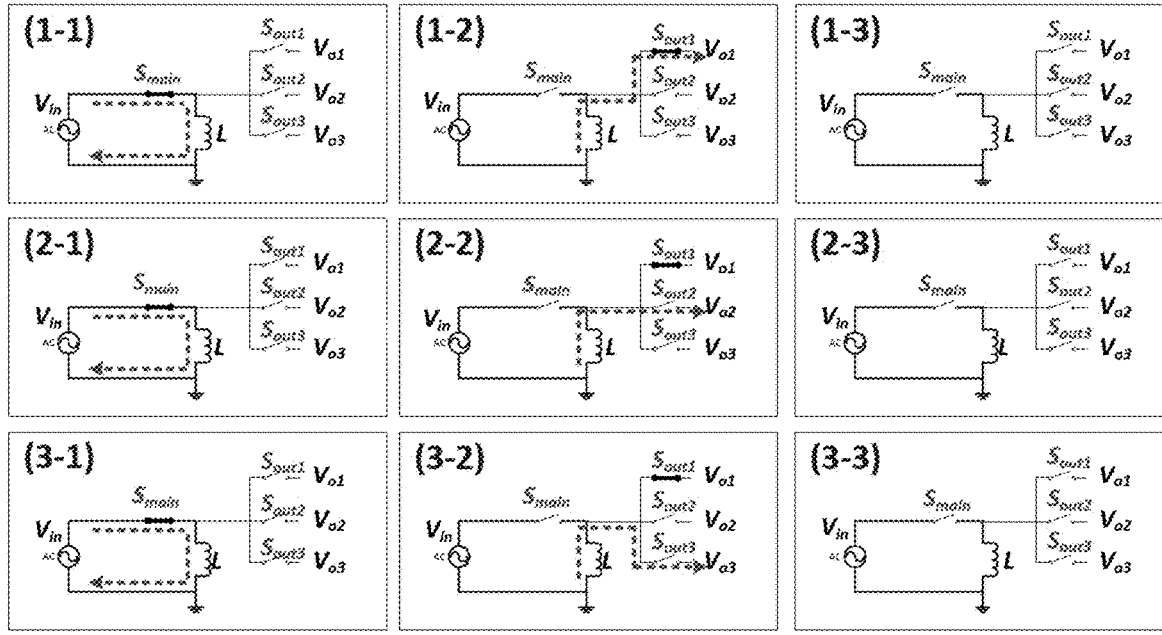

FIG. 10(a) depicts ideal timing diagram for the main switch, output switches, inductor current, and the output voltages when the AC input (line) voltage ($V_{in}$) is positive ($V_{in}>0$); FIG. 10(b) reports the corresponding switching sequence when $V_{in}>0$; and FIG. 10(c) reports the switching sequence when $V_{in}<0$.

Table II reports the design specifications of the proposed SIMO AC-AC converter in another embodiment.

Figure 11:
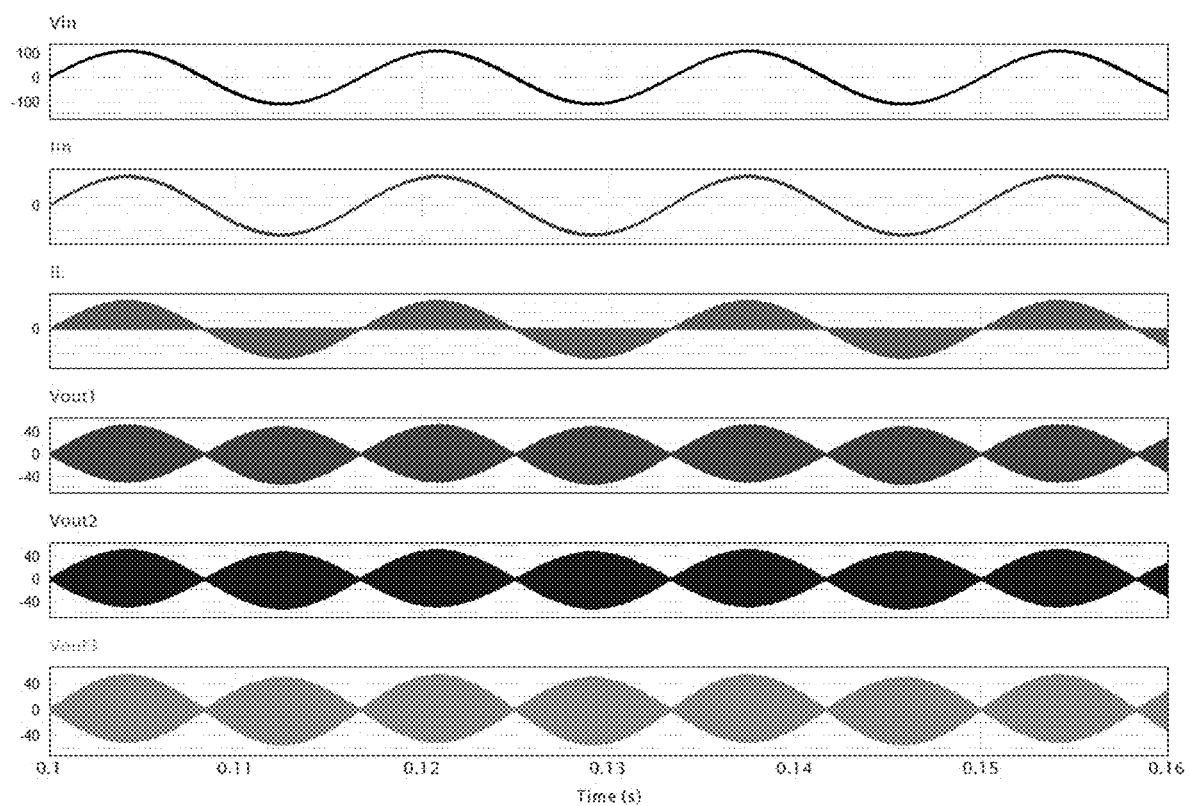

FIG. 11 depicts the simulated waveforms for the proposed SITO converter with three identical loads in another embodiment.

Figure 12:
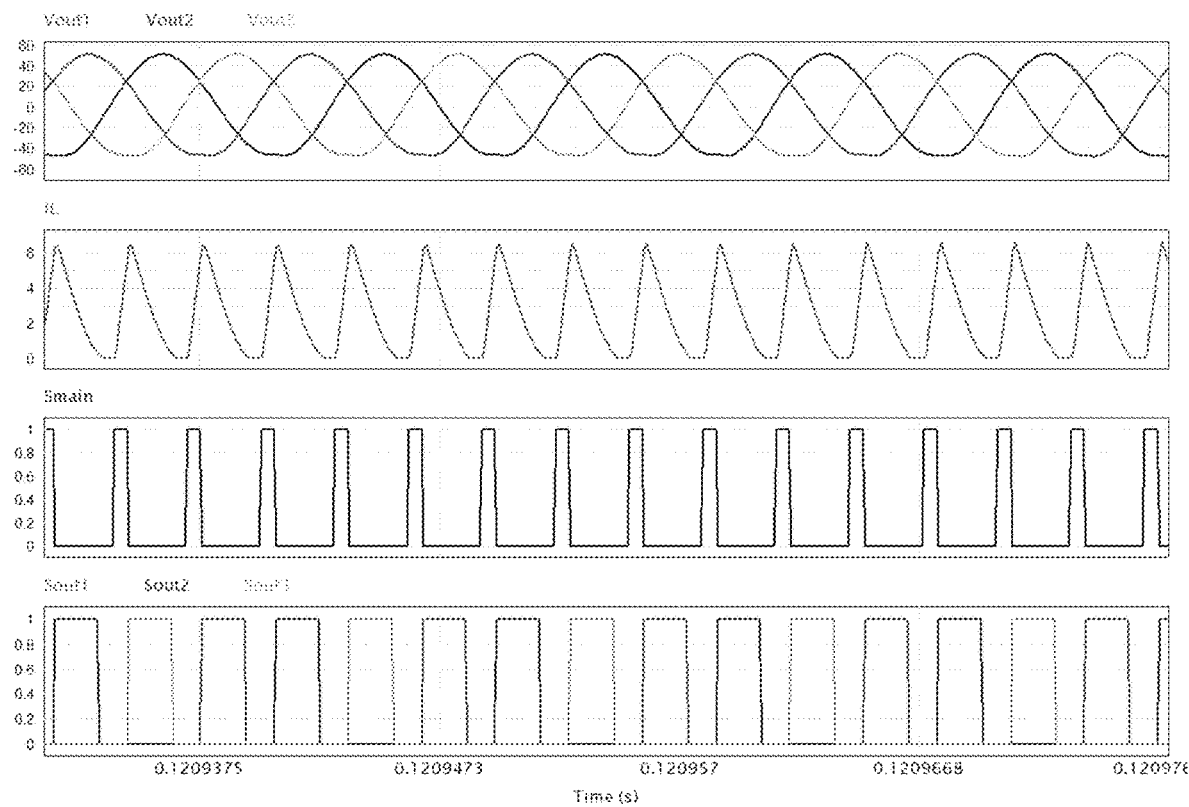

FIG. 12 depicts the expanded view of FIG. 11 when $V_{in}$ attains its maximum value in another embodiment.

Figure 13:
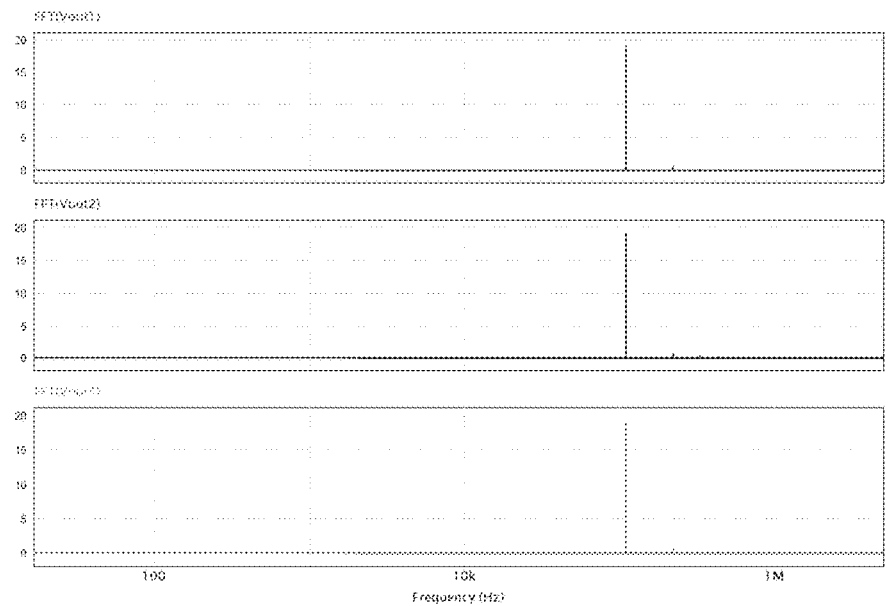

FIG. 13 depicts the frequency spectrum of the three output voltages in the proposed SITO converter with three identical loads in another embodiment.

Figure 14:
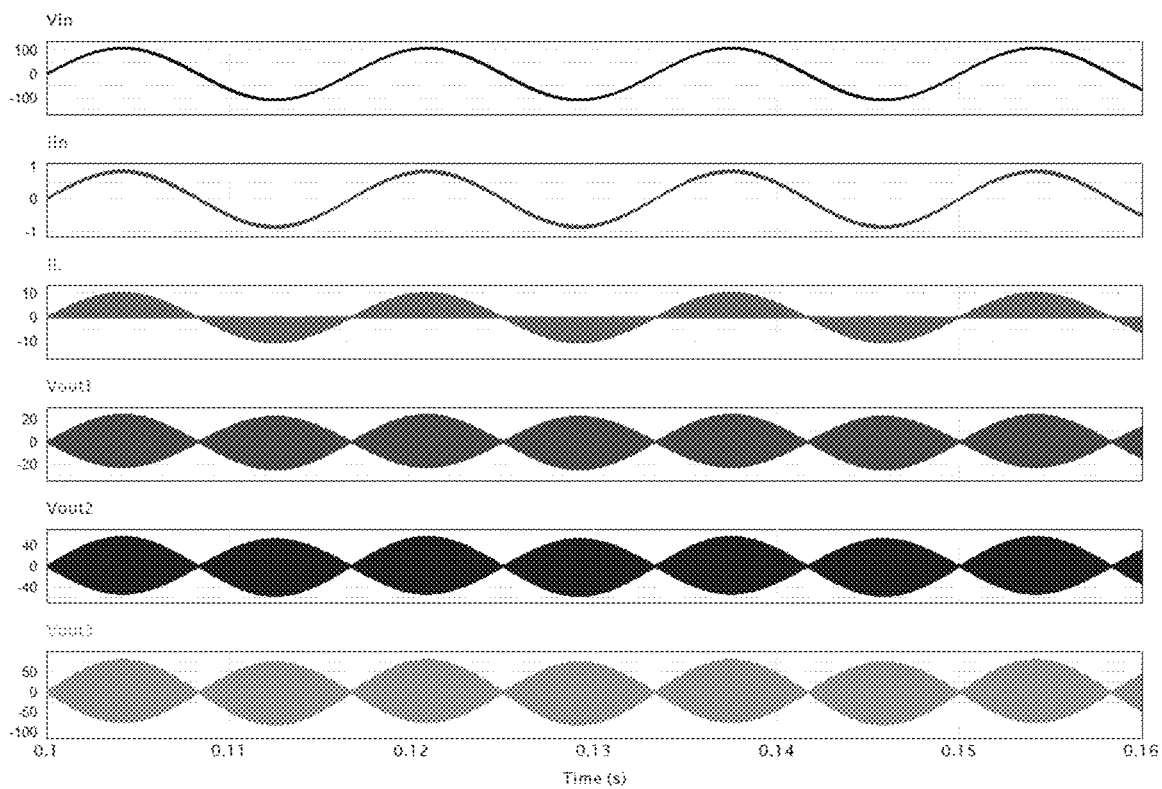

FIG. 14 depicts the simulated waveforms for the proposed SITO converter with three distinct loads in another embodiment.

Figure 15:
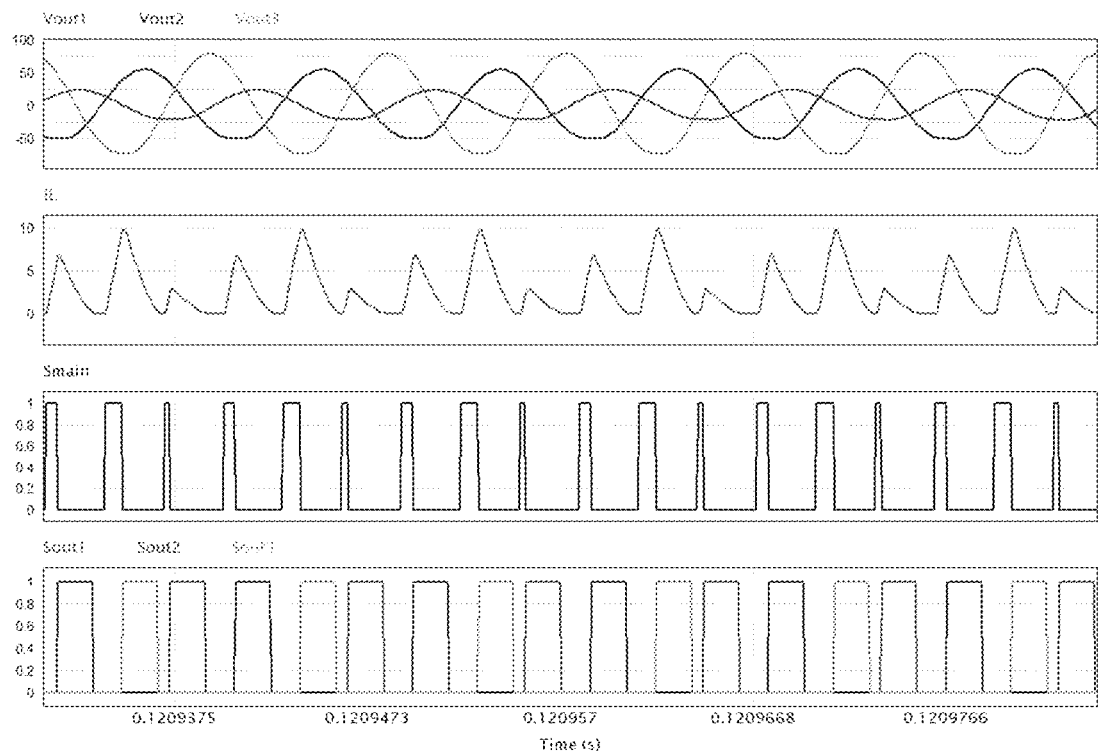

FIG. 15 reports an expanded view of FIG. 14 when $V_{in}$ attains at its maximum value.

Figure 16:
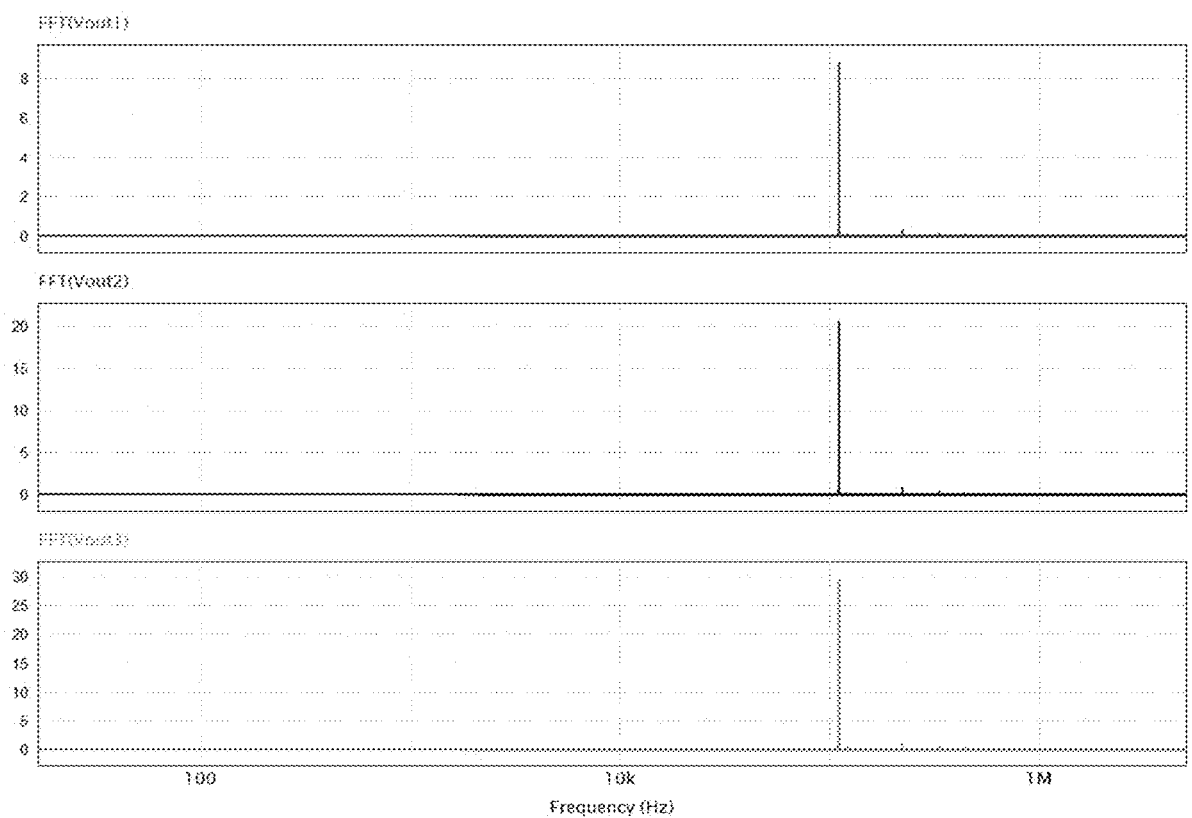

FIG. 16 depicts the frequency spectrum of the three output voltages in the proposed SITO converter with three distinct loads in another embodiment.

DETAILED DESCRIPTION

Disclosed herein is a bridgeless single-stage single-inductor multiple-output (SIMO) AC-AC power converter which transforms an AC input voltage into multiple AC output voltages, each of which can be independently controlled, and can be connected to an AC load or a transmitting coil to form a multiple-coil wireless power transfer system. One advantage is to provide a single-stage conversion from an AC input voltage directly to multiple AC output voltages with only a single inductor in the power stage. The inductor provides energy to all AC outputs in a time-multiplexed fashion. This converter significantly reduces the total component count in the entire system, hence reducing the build-of-material (BOM) costs and overall size and weight. Compared with the existing power supply topologies currently used for driving multiple transmitting coils in wireless power system, the proposed bridgeless single-stage AC-AC SIMO topology, also referred to as the AC-AC SIMO converter in this patent report, offers one or more of the following advantages: 1. Compactness; 2. Low cost; 3. Scalability for any number of transmitting coils (or AC loads); 4. Ease of implementation; and 5. Relatively high efficiency.

Described herein is a new circuit topology that provides an improvement to existing products. Commercial solutions for realizing multiple-channel wireless power transfer supplied by the AC mains require an external AC/DC power adapter to generate the DC bus voltage, which require more external components and are highly inefficient. By employing the proposed SIMO AC-AC topology, higher power transfer efficiency can be achieved with a significant savings in the total system cost. The new circuit topology enables the original equipment manufacturers (OEMs) and original design manufacturers (ODMs) to develop best-in-class wireless power delivery systems such as the future generation Qi wireless charger for mobile phones, laptops, and other portable electronic devices.

The SIMO converter topology offers a simple, scalable and low-cost solution for generating multiple AC outputs. Unlike the classical topologies such as multiple-output parallel half-bridge/full-bridge inverter, multiple-output series resonant inverter (MOSRI) or multiple-output resonant matrix converter, the SIMO converter topology described herein uses the smallest number of power switches, gate drivers, and passive components to achieve robust AC-AC power conversion and high efficiency. In addition, the converter described herein requires only a one-stage power conversion to drive multiple loads concurrently and thus enables the use of a consolidated controller to regulate the output power and therefore significantly reduces the control complexity. Consequently, the described herein converter is a low cost, energy efficient, and more compact-sized circuit for WPT system with multiple coils.

Figure 1:
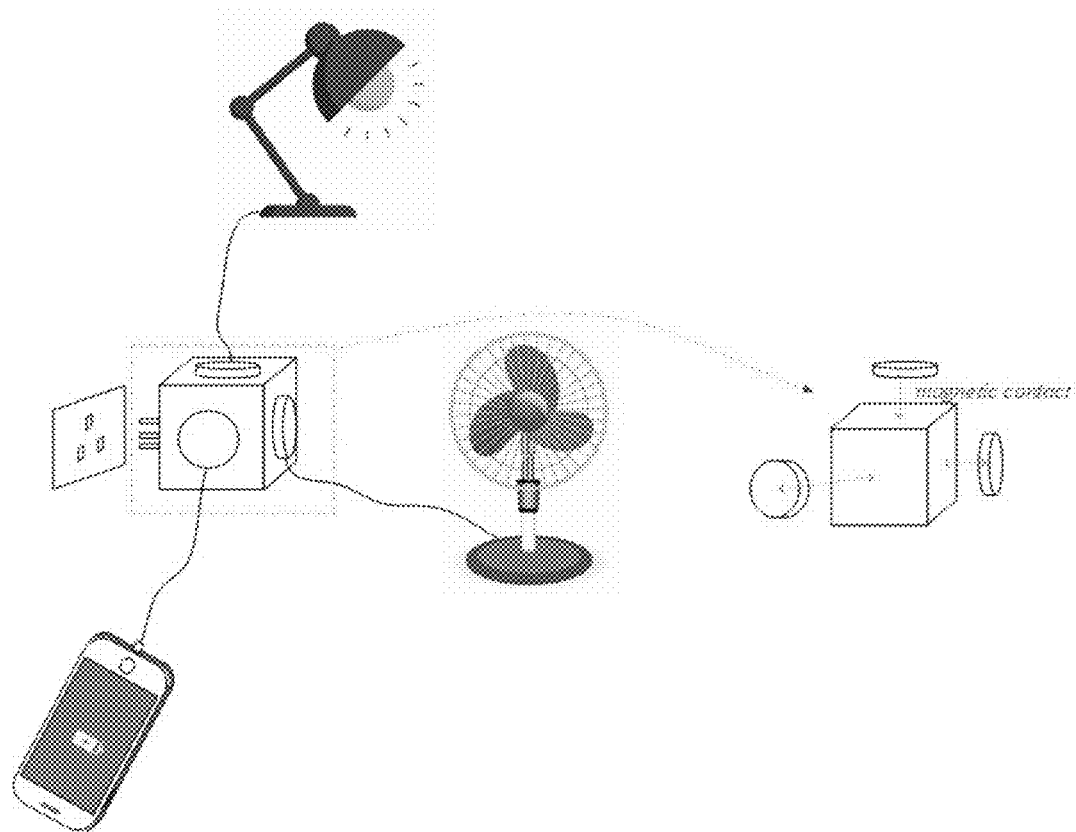
FIG. 1 depicts a general application of the AC-AC SIMO system in one embodiment as further described herein.

FIG. 1 shows a general application of the AC-AC SIMO system in accordance with one embodiment. The AC-AC SIMO system is connected to a wall outlet and supplied by AC mains voltage. The AC-AC SIMO system directly transforms the input AC voltage into multiple AC output voltages. The AC-AC SIMO system is capable of feeding multiple transmitting coils for simultaneously supplying multiple unidentical appliances with receiving coils via wireless power transfer (WPT) via magnetic contact of the socket and the plug.

From the AC-AC SIMO systems described herein, simple, compact, scalable and low-cost solutions to form a magnetic contacted wireless charger are achievable since the AC-AC SIMO systems employs only a single inductor to drive multiple independent AC loads. The loads can be portable electronics products with compatible receiver coils, heating utensils such as those suitable for inductive cooking, home appliances using electric motors such as fans, vacuum cleaners, etc., and AC-powered lighting. The AC-AC SIMO systems can also provide a child-safe mechanism since the AC-AC SIMO systems do not require any wired connection and/or plug adapters.

Figure 2:
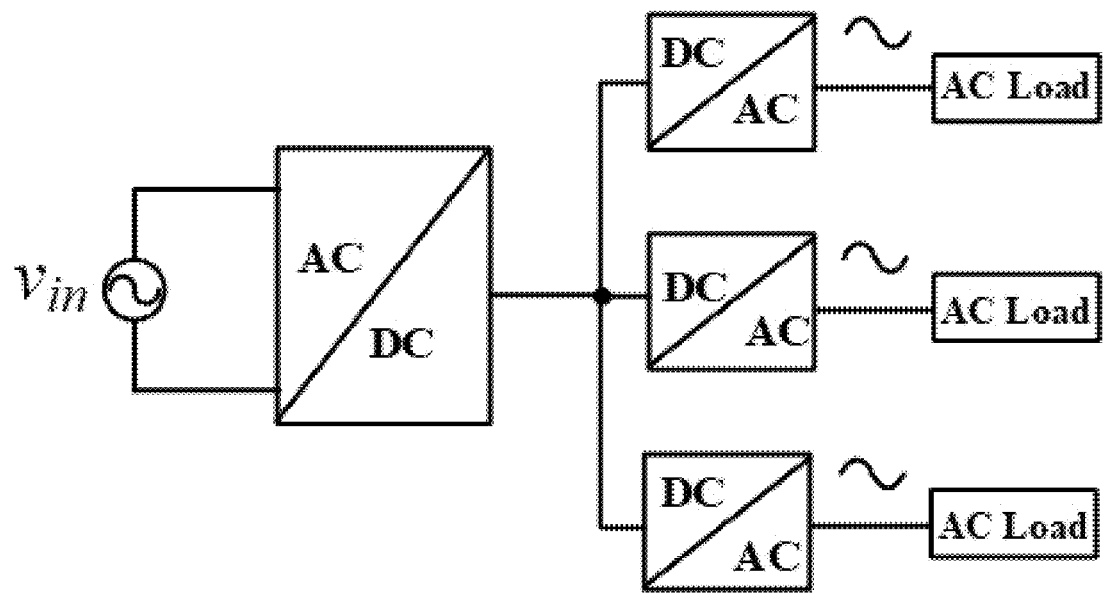
FIG. 2 depicts a system architecture of a conventional AC-AC multiple-output power supply.

Conventional multiple-output architecture employs multiple power converters, each generates an AC output to supply an AC load, such as a transmitting coil for a wireless power transfer system. An AC/DC adapter performs AC-DC conversion from the AC mains supply to provide a DC bus. The power stage of each transmitter typically consists of a full-bridge inverter and a resonant network. FIG. 2 shows the simplified system architecture of the power stage for a conventional multi-coil transmitter with multiple AC outputs. A major drawback of this conventional topology is that the number of DC-AC converters (or inverters) is directly proportional to the number of AC loads, as shown in FIG. 2. Therefore, the number of inverters increases with an increasing number of AC loads, which leads to higher costs and larger size. Compared with the conventional power supply topology, the new AC-AC SIMO described herein offers a simple, compact, scalable and low-cost solution since it employs only a single inductor to drive multiple independent AC loads.

Figure 3:
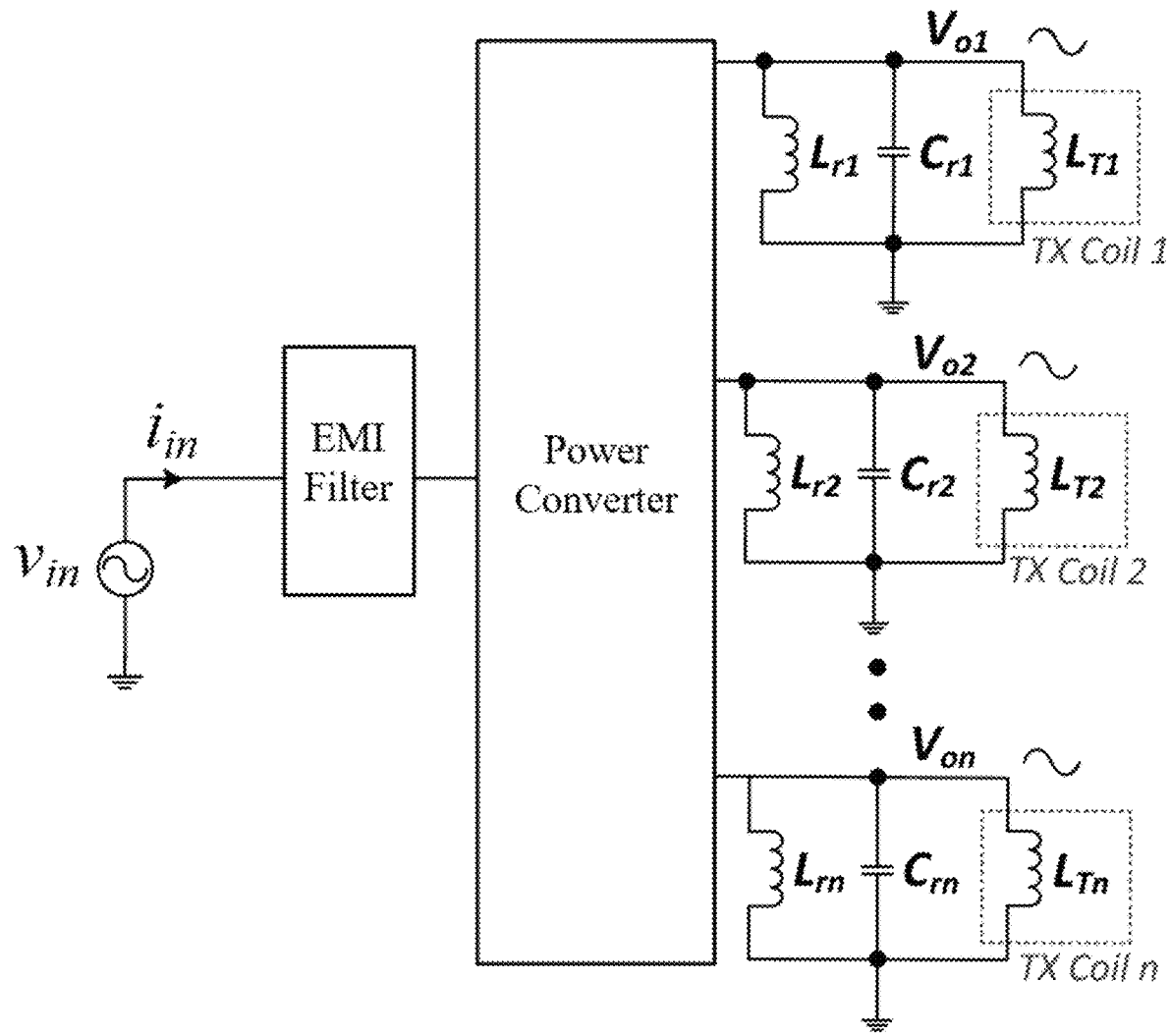
FIG. 3 depicts a simplified functional block diagram of a bridgeless single-stage SIMO AC-AC converter in another embodiment as further described herein.

As an introduction to the novel single-stage SIMO converter, reference is made to FIG. 3. FIG. 3 shows the simplified functional block diagram of the proposed converter to drive multiple independent transmitter antennae (coils) simultaneously for wireless power transfer applications.

The major functional block of the proposed SIMO converter is made of or consists of a common single-inductor multiple-output (SIMO) power converter and a plurality of parallel inductive-capacitive (LC) resonant-tanks, which are in turn connected to their corresponding transmitter coils (Tx coils). Only one inductor is used in the power stage of the converter. The converter, which can be configured as buck, boost, or buck-boost modes, operates in Discontinuous Conduction Mode (DCM) in which the inductor current returns to zero at the end of every switching cycle. Each of the independently-driven outputs of the SIMO power converter is connected to a parallel LC resonant circuit consisting of an inductor Lm and a capacitor Cm. The voltage of each LC resonant tank is fed to its corresponding transmitter coil (Tx coil). Wireless power can be transferred from the transmitter coil through magnetic coupling or magnetic resonance to the receiver coil of a compatible load placed in close proximity to the transmitter coil. Since the resonant inductor is connected in parallel with the transmitter coil, the inductance of the resonant inductor is much smaller than that of the transmitter coil in order that the resonant frequency of the resonant tank is not changed significantly even if the transmitter coil is loaded with a nearby receiver coil with a load. Effectively, the LC resonant tank acts like a high-frequency ac power source powering the transmitter coil (and its corresponding receiver load).

Energy is periodically transferred from the power stage of the SIMO power converter into each of the resonant circuits in a sequential fashion. The SIMO power converter feeds the current sequentially into a group of parallel resonant tanks. Each resonant tank turns the current source into an AC power source at the resonant frequency (with sinusoidal AC output voltage and current within the resonant tank). The switching frequency of the SIMO power converter is an integer multiple of the resonant frequency, where the switching frequency is defined as the switching frequency of the main power switch ($S_{main}$).

The SIMO converter topology offers a simple, scalable and low-cost solution for generating multiple AC outputs. Unlike the classical topologies such as multiple-output parallel half-bridge/full-bridge inverter, multiple-output series resonant inverter (MOSRI) or multiple-output resonant matrix converter, the new SIMO converter topology uses the smallest number of power switches, gate drivers, and passive components to achieve robust AC-AC power conversion and high efficiency. In addition, the converter requires only a one-stage power conversion to drive multiple loads concurrently and thus enables the use of a consolidated controller to regulate the output power and therefore significantly reduces the control complexity.

In the new single-stage SIMO converter topology, each additional load requires only one more output switch. Each output switch (or main switch) can be implemented by a pair of back-to-back connected power MOSFETs to prevent unintended reverse conduction via the intrinsic body diode of the MOSFET even when it is OFF. Hence, the total number of power MOSFETs required is 2(N+1) for the proposed converter with buck-boost power stage, where N is the total number of outputs. Table I summarizes the total number of power MOSFETs required for the proposed non-isolated converters whose power stage can either be configured as buck, boost, and buck-boost modes. Compared with the prior art, the converter topology described herein requires a much smaller number of power switches and gate drivers for the same number of loads. The converter topology described herein achieves at least one of a smaller size, lower cost, and higher efficiency, especially when the number of AC loads becomes larger.

The working principles of the proposed SIMO AC-AC converter are discussed beginning with reference to FIG. 4. A buck-boost converter is used for illustrating the operating principles, although other converters such as buck and boost converter (that also use one inductor) can also be used. FIG. 4 shows a system of a "buck-boost converter based" SIMO AC-AC converter with N independent AC outputs.

The energy flowing into each of the AC output loads can be independently adjusted by the duty cycle of $S_{main}$. Due to the nature of the time-multiplexing control scheme, the AC-AC SIMO converter can be modeled as an array of sub-converters since only one of the AC output loads is connected to the power stage of the SIMO converter at any point in time. Assume that the resonant inductor in the resonant tank is much smaller than the inductance of the transmitter coil. This assumption allows the resonant frequency of the resonant tank to remain stable even if the transmitter coil is loaded. The switching frequency of the SIMO converter is determined by the total number of outputs in conjunction with the resonant frequency of the output load, which is dependent on the values of $L_{oi}$ and $C_{oi}$, where the index i denotes the $i^{th}$ output. Mathematically, it can be represented as follows.

$$f_{sw} = Nf_o = \frac{N}{2\pi\sqrt{L_{oi}C_{oi}}} \quad (1)$$

where $f_{sw}$ is the switching frequency, $f_o$ is the resonant frequency, and N is the total number of outputs.

Typically, the operating frequency of the Qi wireless power standard ranges between 87 kHz and 205 kHz. If the devices/systems described herein are used to conform to the Qi standard, the resonant frequency (or output frequency) of the SIMO converter can fall within this frequency range. Of course, a frequency that suits other international standards can also be chosen. For a particular resonant frequency, the appropriate values of $L_o$ and $C_o$ can be determined. At resonance, the equivalent impedance of the ideal parallel resonant tank can be expressed as $$Z_{eq} = R_{oi} + \omega L_{Ai} \quad (2)$$

where $R_{oi}$ is the winding resistance and $L_{Ai}$ is the inductance of an ideal lossless transmit coil.

The switching sequence of all the SIMO switches, namely the main power switch and the output switches, is now explained, by first assuming that the power stage of the proposed inverter is configured as a buck-boost converter for illustration purpose. FIG. 5 shows the timing relationship for the main power switch ($Q_1$ and $Q_2$), the output switches ($Q_{o11}$ and $Q_{o12}$, $Q_{o21}$ and $Q_{o22}$, ..., $Q_{on1}$ and $Q_{on2}$) and the inductor current ($I_L$).

At the beginning of each switching cycle, the main switches $Q_1$ and $Q_2$ is turned ON at the rising edge of the gate driving signal $S_{main}$. During the first sub-interval of DCM, $Q_1$ and $Q_2$ are turned ON and all the output switches are turned OFF. The inductor current ramps up with a positive slope of $m_1 = V_{in}/L$. At the end of the first sub-interval, the inductor current reaches its peak value $I_{L,pk}$ which is represented as follows.

$$I_{L,pk} = m_1 D_1 T_s = \left(\frac{V_{in}}{L}\right) D_1 T_s \quad (3)$$

Once the inductor current attains the peak value given by (3), $Q_1$ and $Q_2$ are turned OFF and one pair of the output switches is turned ON (while the remaining output switches are OFF). This marks the beginning of the second sub-interval in DCM. The inductor current then ramps down with a negative slope of $m_2 = -V_o(t)/L$, where $V_o(t)$ represents the instantaneous value of the sinusoidal output voltage. The output switch remains ON until the zero-crossing of the inductor current is detected. At the end of the second sub-interval, the inductor is fully discharged and the output switch is turned OFF under zero-current condition. The SIMO converter then enters the third sub-interval (so-called idle phase) in which all the switches are turned OFF and the inductor current remains at zero until the arrival of the next rising edge of the switching clock. The aforementioned switching sequence then repeats itself for every switching cycle. One of the main ideas is that the time-shared inductor delivers the required energy into each of the AC loads in a round-robin fashion.

The down-slope of the inductor current ($m_2$) actually varies with the instantaneous value of the sinusoidal output voltage. Since the output voltage can be decoupled into a DC (average) component and an AC component. For the sake of simplicity, first-order approximation is applied by considering only the DC component of the output voltage during the second sub-interval. As a result, the down-slope of the inductor current can be represented as a straight line, as depicted in FIG. 6, which can be mathematically written as follows.

$$m_2 = -\frac{\overline{V_o}}{L} \quad (4)$$

where $\overline{V_o}$ denotes the average output voltage during the second sub-interval.

FIG. 5 depicts the general case of unbalanced AC loads, i.e. different power levels are delivered from the power stage to every output. The average inductor current going into each output load is different which is characterized by the distinct peak values of the inductor current across the outputs.

Soft switching can be used in the output switches to mitigate the switching loss and reduce the generation of EMI. As an example, at the end of the second sub-interval when the inductor current returns to zero, the output switch $S_{out1}$ can be turned OFF with zero-current switching (ZCS). The same soft switching technique can also be applied to other output switches.

The switching sequence of the new inverter is also explained herein when the power stage of proposed converter is configured as a buck converter. FIG. 6 shows the corresponding system for the proposed SIMO converter. There are two pairs of power switches ($Q_{H1}$ and $Q_{H2}$, $Q_{L1}$ and $Q_{L2}$) in the power stage and N pairs of output switches ($Q_{o11}$ and $Q_{o12}$, $Q_{o21}$ and $Q_{o22}$, ..., $Q_{on1}$ and $Q_{on2}$) and in the output stage. Hence, a total of 2(N+2) switches are required in this embodiment of the topology.

The timing relationship for the high-side and low-side power switches ($Q_{H1}$ and $Q_{H2}$, $Q_{L1}$ and $Q_{L2}$), the output switches ($Q_{o11}$ and $Q_{o12}$, $Q_{o21}$ and $Q_{o22}$, ..., $Q_{on1}$ and $Q_{on2}$) and the inductor current ($I_L$) is depicted in FIG. 7. For illustration purposes, the first output of the AC-AC SIMO converter is considered. At the beginning of each switching cycle, the high-side power MOSFETs ($Q_{H1}$, $Q_{H2}$) and the pair of the output MOSFETS at the first output branch ($Q_{o11}$, $Q_{o12}$) are turned ON at the rising edge of the switching clock. During the first sub-interval of DCM, $Q_{H1}$ and $Q_{H2}$ remain ON and the inductor current ramps up with a positive slope of $m_1=(V_{in}-V_{o1})/L$. At the end of the first sub-interval, the inductor current reaches its peak value $I_{L,pk}$ which can be expressed as:

$$I_{L,pk} = m_1 D_1 T_s = \left[\frac{V_{in}-V_{o1}(t)}{L}\right] D_1 T_s \quad (5)$$

Once the inductor current reaches its peak value given by (5), the high-side power MOSFETs ($Q_{H1}$, $Q_{H2}$) are turned OFF and then the low-side power MOSFETs ($Q_{L1}$, $Q_{L2}$) are turned ON. This marks the beginning of the second sub-interval in DCM. The inductor current ramps down with a slope of $m_2=-V_{o1}(t)/L$, where $V_{o1}(t)$ represents the instantaneous value of the first sinusoidal output voltage. $Q_{L1}$ and $Q_{L2}$ remain ON until either the zero-crossing of the inductor current is detected. At the end of the second sub-interval, the inductor is fully discharged and $Q_{L1}$ and $Q_{L2}$ are turned OFF under zero-current condition. The SIMO converter then enters the third sub-interval (so-called idle phase) in DCM where the inductor current remains at zero until the arrival of the next rising edge of the switching clock. $Q_{o11}$ and $Q_{o12}$ remain ON for the full switching cycle. The switching sequence then repeats itself in the following switching cycle for another output.

On the other hand, the power stage of the new SIMO converter topology can also be configured as boost type. FIG. 8 shows the corresponding circuit topology for the proposed SIMO converter. In this particular topology, there are a pair of power MOSFETs ($Q_1$ and $Q_2$) in the power stage and N pairs of output MOSFETs ($Q_{o11}$ and $Q_{o12}$, $Q_{o21}$ and $Q_{o22}$, ..., $Q_{on1}$ and $Q_{on2}$) and in the output stage. Hence, it requires a total of 2(N+1) MOSFETs. The corresponding timing diagram between the power switch ($S_{main}$), the output switches ($S_{out1}$, ..., $S_{outn}$), and the inductor current ($I_L$) is essentially identical to that shown in FIG. 5.

Another/alternative requirement of the new SIMO converter is that it must operate in DCM. This means that the inductor current always returns to zero at the end of every switching cycle. The inductor current is fed to each individual AC output in a time-multiplexed fashion. The use of this time-multiplexing control scheme with multiple energizing phases means that the outputs are fully decoupled in time. In other words, a load change in one output will not induce an unwanted change in another output. Hence, it results in negligible cross-regulation across the outputs.

The operating modes of the SIMO AC-AC converter are elaborated in more detail in the following discussions using the single-inductor three-output (SITO) boost converter as an example as shown in FIG. 9.

FIG. 9 shows that there are a total of eight power MOSFETs (i.e. 2(N+1), where N=3), which includes one pair of MOSFETs for the main switch $S_{main}$ and three pairs of MOSFETs for the three output switches ($S_{out1}$, $S_{out2}$, $S_{out3}$). L is the main inductor. The AC load is characterized by a resonant tank which consists of a parallel combination of Cri, Ln, and the transmit antenna coil $L_{Ti}$. $V_{in}$ is the AC input voltage of the SIMO converter. $V_{o1}$, $V_{o2}$ and $V_{o3}$ are the three individual AC output voltages. $I_L$ is the inductor current. $I_{o1}$, $I_{o2}$ and $I_{o3}$ are the output currents which flow through the corresponding output switches.

Figure 10C:
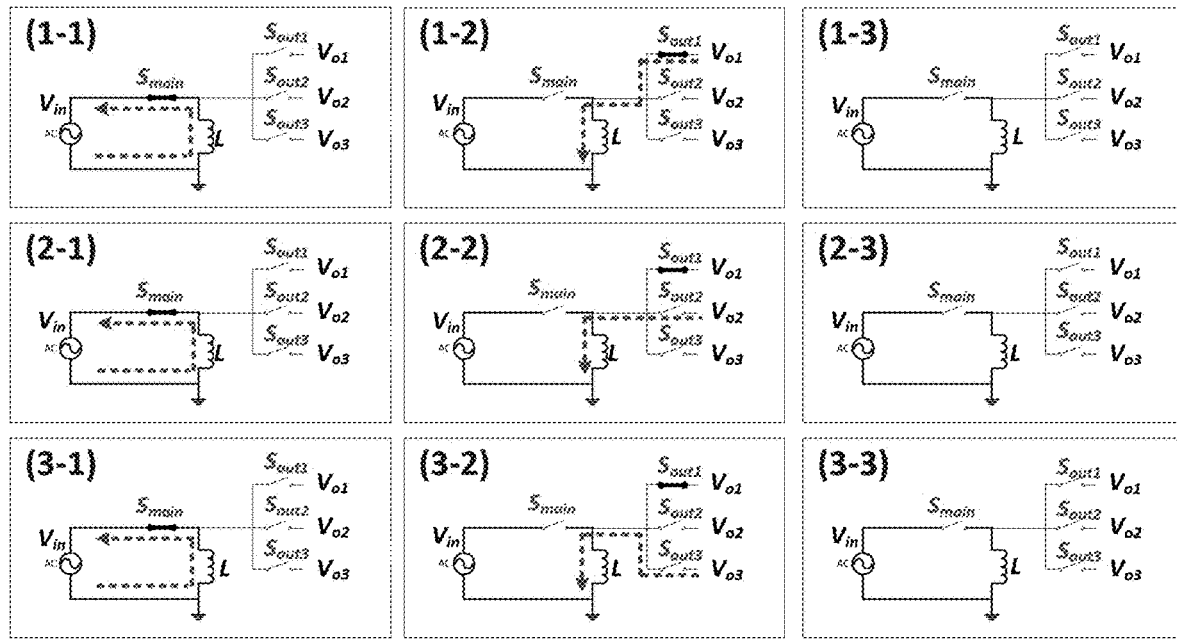

The ideal waveforms of all switches ($S_{main}$, $S_{out1}$, $S_{out2}$, $S_{out3}$), the inductor current ($I_L$), and the output voltages ($V_{o1}$, $V_{o2}$, $V_{o3}$) are shown in FIG. 10(a), where $T_s$ denotes the switching period of the main switch $S_{main}$, and $T_0$ denotes the switching period of the output switches ($S_{out1}$, $S_{out2}$, $S_{out3}$). FIG. 10(a) clearly shows that the proposed SIMO AC-AC converter operates in DCM where the inductor current $I_L$ always returns to zero value at the end of every switching cycle. FIG. 10(b) shows the corresponding switching sequence of the proposed SIMO AC-AC converter when $V_{in}>0$. FIG. 10(c) shows the switching sequence when $V_{in}<0$, where $V_{in}$ is the AC input (line) voltage.

In one embodiment, there are three distinct modes of operation per output during one switching period $T_s$ which can be categorized as follows (Note: The first output is used as an example).

Mode 1 ($t_0$-$t_1$): The main switch $S_{main}$ is ON and all the output switches are OFF. The inductor current $I_L$ ramps up at a linear rate of $V_{in}/L$. Mode 1 for the first output is annotated as (1-1) in FIG. 10. Likewise, Mode 1 for the second and third output are annotated as (2-1) and (3-1), respectively.

Mode 2 ($t_1$-$t_2$): The main switch $S_{main}$ is OFF and the first output switch $S_{out1}$ is ON while the other two output switches are OFF. The inductor current $I_L$ ramps down at a rate of $[V_{in}-V_{o1}(t)]/L$ until $I_L$ drops to zero which marks the end of Mode 2. Mode 2 for the first output is annotated as (1-2) in FIG. 10. Likewise, Mode 2 for the second and third output are annotated as (2-2) and (3-2), respectively.

Mode 3 ($t_2$-$t_3$): All the switches are OFF. $I_L$ remains at zero during this idle period. Mode 3 for the first output is annotated as (1-3) in FIG. 10. Similarly, Mode 3 for the second and third output are annotated as (2-3) and (3-3), respectively.

The second and third output follow the same switching sequence as the first output. The energy from the inductor is distributed to the three outputs in a time interleaving manner. It should be noted that the same switching sequence can be scaled conveniently to N outputs, where N is the total number of transmit coils.

Time-domain simulations are conducted using the PSIM software in order to confirm the feasibility of the proposed SIMO AC-AC converter based on the design specifications listed in Table II.

For illustration purpose, a resonant (output) frequency of 111 kHz is chosen which falls within the specified frequency range from the Qi standard (i.e. 87 kHz and 205 kHz). Other frequency values within this range can also be used in our simulations. First, a balanced load condition is investigated in which the three sinusoidal output voltages have the same frequency and magnitude.

FIG. 11 shows the simulated waveforms for the SITO converter with three identical loads. The output frequency is 111 kHz which is one third of the switching frequency (333 kHz). The power factor is 0.9999. The three AC outputs have same RMS values, i.e., 25.4 V. FIG. 12 is the expanded view of FIG. 11 when the instantaneous value of the sinusoidal input AC voltage ($V_{in}$) is at its maximum value. Notice that the phase difference between any two outputs is 120°. In general, for a SIMO converter with N outputs, the phase difference between any two outputs is given by 2π/N. FIG. 13 shows the corresponding FFT spectrum for the three sinusoidal outputs. It clearly shows that they have the same fundamental frequency of 111 kHz and same voltage levels.

A second scenario of unbalanced load condition is investigated in which the three sinusoidal output voltages have the same frequency but different RMS values (or different peak amplitudes). FIG. 14 shows the simulated waveforms for the SITO converter with three distinct loads. The power factor is 0.9998. The three AC outputs have different RMS values, i.e., 11.7 V, 27.2 V and 39.1 V. FIG. 15 is the expanded view of FIG. 14 when the instantaneous value of the sinusoidal input AC voltage ($V_{in}$) is at its maximum value. Unlike the previous case of balanced load, the inductor current exhibits distinct peak values for each of the three outputs in the unbalanced load scenario. FIG. 16 shows the corresponding FFT spectrum for the three sinusoidal outputs. It clearly shows that they have the same fundamental frequency of 111 kHz but different voltage levels.

The simulation results verify the functionality of the new SITO converter which uses a single inductor to generate multiple independent AC voltages. The new SITO converter can generate a high quality sine wave at each output with very low harmonics. The amplitude of each output voltage can be independently adjusted by varying the duty cycle of main switches.

A bridgeless single-stage AC-AC SIMO converter is described which makes use of a single inductor to generate multiple independent AC output voltages, each of which can be independently controlled, and can be connected to an AC load or a transmitting coil to form a multiple-coil wireless power transfer system. The advantages of the topology include at least one of a smaller component count, lower BOM cost, simplified control scheme, ease of implementation and higher power efficiency. Both the simulation and experimental results corroborate that the circuit meets the target design specifications and performance requirements.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A system for generating multiple independent alternating current (AC) voltages from an AC voltage source, comprising:
   a front-stage power converter comprising:
      one input inductor that stores energy from an AC voltage source, and
      a main switch between the AC voltage source and the input inductor that controls inductor current from the AC voltage source to the input inductor, wherein the input inductor is connected in parallel with the AC voltage source; and
   a plurality of selectable output branches comprising respective output selection switches that are configured to selectively connect and disconnect the selectable output branches to the front-stage power converter, wherein a selectable output branch of the selectable output branches comprises a resonant tank and a transmitter coil, and wherein the resonant tank converts input AC power from the front-stage power converter into an AC power that is provided to the transmitter coil.

2. The system according to claim 1, wherein the front-stage power converter comprises a switched mode power electronic circuit.

3. The system according to claim 2, wherein the switched mode power electronic circuit comprises at least one of a buck power converter, a boost power converter, or a buck-boost power converter.

4. The system according to claim 1, wherein the resonant tank comprises an inductor and a capacitor connected in parallel, and an AC voltage across the capacitor is provided to the transmitter coil.

5. The system according to claim 1, wherein the inductor current of the front-stage power converter is controlled by the main switch in a discontinuous current mode (DCM).

6. The system according to claim 5, wherein inductor current pulses are directed to the plurality of selectable output branches through control of the output selection switches.

7. The system according to claim 5, wherein a switching frequency of the main switch is an integer multiple of a resonant frequency of the resonant tank.

8. The system according to claim 1, wherein the output selection switches are turned on sequentially one at a time in accordance with a switching sequence, and an input inductor current from the input inductor is delivered to the selectable output branches in sequence based on the switching sequence.

9. The system according to claim 1, wherein the transmitter coil provides wireless power to a load that has a receiver coil tuned at a resonant frequency of the resonant tank.

10. The system according to claim 9, wherein the load comprises a portable electronic product with compatible receiver coils.

11. The system according to claim 9, wherein the load comprises a heating utensil for inductive cooking.

12. The system according to claim 9, wherein the load comprises a home appliance comprising an electric motor.

13. The system according to claim 9, wherein the load comprises at least one of a fan, a light, or a vacuum cleaner.

14. The system according to claim 1, wherein an inductance of the transmitter coil is larger than an inductance of a resonator inductor.

15. A method for generating multiple independent alternating current (AC) voltages from an AC voltage source, comprising:
providing electrical energy from an AC voltage source; and
generating multiple AC outputs from an AC voltage source using a front-stage power converter and a plurality of selectable output branches comprising respective output selection switches that are configured to selectively connect and disconnect the selectable output branches to the front-stage power converter, wherein
the front stage power converter comprises one inductor that stores energy from the AC voltage source and a main switch between the AC voltage source and the input inductor that controls inductor current from the AC voltage source to the input inductor,
the input inductor is connected in parallel with the AC voltage source,
a selectable output branch, of the selectable output branches, comprises a resonant tank and a transmitter coil, and
the resonant tank converts input AC power into an AC power that is provided to the transmitter coil.

16. The method according to claim 15, further comprising:
controlling an inductor current of the front-stage power converter by controlling the main switch in a discontinuous current mode (DCM).

17. The method according to claim 16, further comprising:
directing inductor current pulses to the plurality of selectable output branches by controlling the output selection switches.

18. The method according to claim 15, further comprising:
controlling the output selection switches in a manner that not more than one of the output selection switches is turned on at a given time, and that an input inductor current from the input inductor is delivered to the selectable output branches in sequence.

19. The method according to claim 15, further comprising:
operating the main switch at a switching frequency that is an integer multiple of a resonant frequency of the resonant tank.

20. The method according to claim 15, further comprising providing, by the transmitter coil, wireless power to a load that has a receiver coil tuned at a resonant frequency of the resonant tank.

* * * * *